Figure 1:
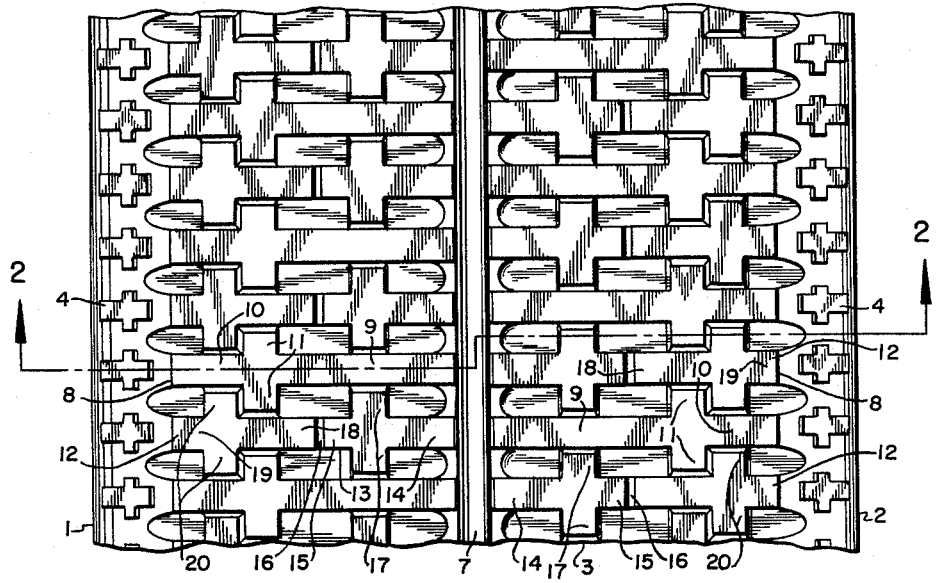

Feb. 9, 1965  M. TIBORCZ  3,168,916
OVERLAPPING CROSSES IN TREADS FOR TIRES
Filed Aug. 30, 1963  2 Sheets-Sheet 1

INVENTOR,
MICHAEL TIBORCZ
BY *J. Stuart Freeman,*
ATTORNEY

INVENTOR,
MICHAEL TIBORCZ
BY
ATTORNEY

United States Patent Office 3,168,916
Patented Feb. 9, 1965

3,168,916
OVERLAPPING CROSSES IN TREADS FOR TIRES
Michael Tiborcz, 714 Market St., Akron, Ohio
Filed Aug. 30, 1963, Ser. No. 305,664
1 Claim. (Cl. 152—209)

The invention comprises improvements in the tread surfaces of tires, and has for its object several improvements in the capture and at least the partial retention of air in pockets upon the tire surface, which air being under pressure due to the aggregate weight of a vehicle divided by the number of tires to support it, results in a really superior pressure between the tire and the road surface beneath it, at least until some of the more shallow conduits between the surface sections become lost through the inevitable wear of the road upon the tire.

Another object is to provide a tire surface that is made up of a practically innumerable lot of crosses, whether they respectively comprise single shanks or a plurality of such shanks, all interested line by line into the spaces between the shanks and laterally spaced cross-arms from the tires, that are interim posed between cross arms of other crosses laterally spaced with respect thereto.

In addition to the crosses upon the normal tread of the tire, it is another object to so place embossed crosses upon the laterally opposite sides of the tire that they too serve as tread surfaces, when the tire is upon relatively soft or partially yielding ground, and thereby add their tractive effort to that of the tread crosses under especially heavy loads, or those loads which cause the tread proper to sink into the material of the road surface, as for example when it is composed of dirt, sand, small shells as at the seashore, and such other materials as are encountered when the tire runs upon such relatively rare though not uncommon ground.

Among the great number of persons who operate a tire equipped vehicle, and whose driving techniques might be likened to the sands of the sea, there are a great many who through superstition, religious anticedents, or otherwise, consider themselves protected from all forms of danger, including those resulting from a tire vehicle refusing to start or stop as quickly as may be desirable to avoid a person walking upon the road, throwing or catching a ball in front of a car, and the many other types of sudden and unpredictable movements of persons also using the highway, than what the driver of a vehicle may be called upon or expected to do at a given instant, are legion and unpredictable, all dependent upon the more or less irregular figuration carried by the tire treads.

A further object, therefore, is to provide a tire tread that is entirely capable of arresting the movement of a vehicle upon the slightest notice or warning, and in fact stopping it almost instantly as long as the tread surface of the tires of the car are in direct and unyielding engagement with the road, and conversely to start the car and bring it up to the speed of the engine running it, almost as suddenly as the driver may wish, therefore the tie-in of the tire treads with the road must be as positive and unyielding as may be possible, particularly in some cars such as those whose design and intended use is for such as fire engines, ambulances, patrol cars and the like, may need and in fact require it.

Figure 2:
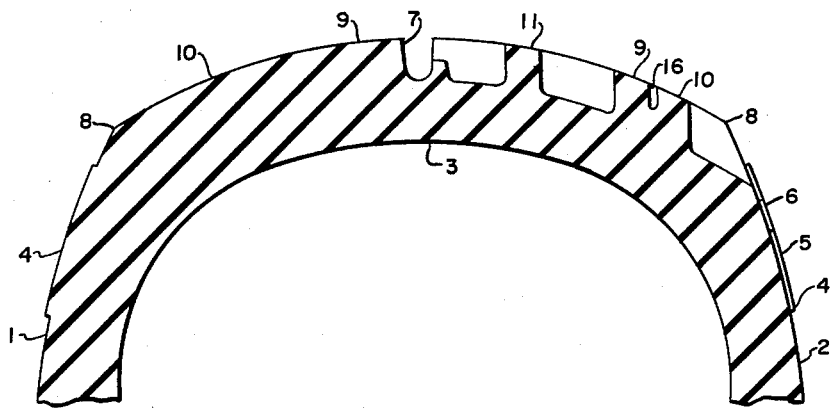
Figure 3:
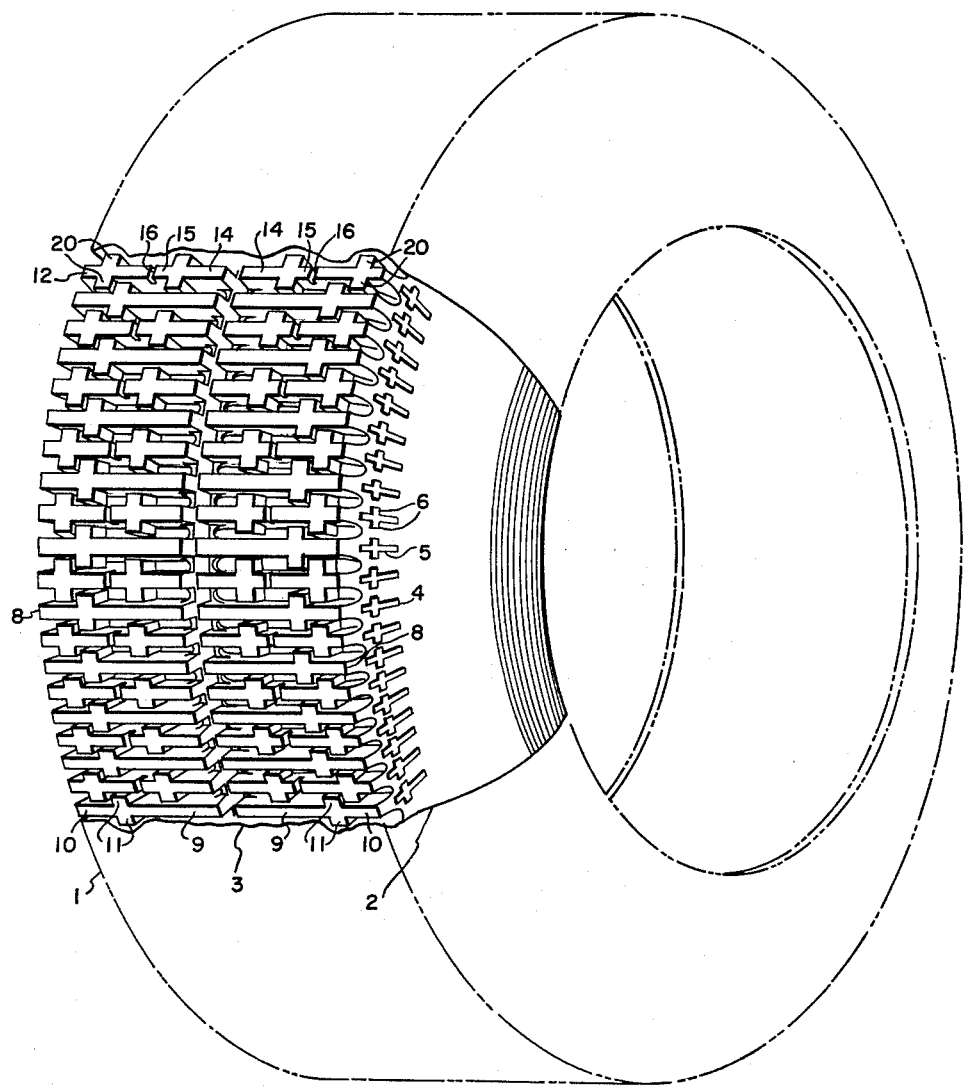

With the objects thus broadly in mind, the invention comprises further details, such as those that are hereinafter fully brought out in the following description, when read in conjunction with the accompanying drawings, in which FIG. 1 is plan view of a fragmentary portion of a tire tread comprising one embodiment of the invention; FIG. 2 is a transverse section on the line 2—2 of FIG. 1; and FIG. 3 is a side elliptical view of the tire showing a portion of the tread as being provided with one embodiment of the improved tire surface.

Referring to the drawings, a representative type of tire is shown as comprising side walls 1 and 2, connected by means of a tread wall 3, the minor details of said tire all being not shown or described. Each side wall is provided with circumferentially spaced raised crosses 4, having the usual radially positioned central embossed portions 5, crossed by oppositely extending lateral arms 6.

The tread portion of the tire is preferably though not necessarily separated into two similar embossed sections by an inwardly extending circumferential groove 7, that are preferably covered by embossed designs hereinafter described, and which therefore will be described individually. Referring specifically therefore to one of the said side sections, it is provided with a relatively elongated cross 8, that comprises essentially an elongated base section 9 and a relatively shorter head section 10, which between said sections there extends laterally in opposite directions a pair of integral arm sections 11, the line of separation being taken centrally through each of said head and base sections to form FIG. 3. Each of these crosses extends from the central groove 7 to the lateral edge of the tread portion 3 of the tire and is duplicated upon the opposite side of the tread as shown.

Between a pair of adjacent large crosses is positioned a pair of relatively shorter crosses 12 and 13, the former being the larger of the two in length at least. Referring first to cross 13, it is provided with base and head sections 14 and 15, that are of the same width as the corresponding portions of said first-mentioned cross, and extend in centralized longitudinal relationship therewith, while the head portion of said last-mentioned cross is separated from the base portion of said first-mentioned larger cross by means of a relatively shallow and much narrower groove 16. From the said base and head portion of this second cross there extend in opposite directions arm sections 17, that it will be noted are of the same overall length as the arm portions of said first-mentioned cross. The head portion 15 of said shorter cross forms a continuation of the base portion 18 of a third cross of substantially less size than said second cross and is separated therefrom solely by means of the said narrow groove 16.

Said third cross further comprises a head portion 19 that extends to and terminates at the lateral side of said tire tread in alignment with the terminii of the two first-mentioned crosses that said third cross separates, while from the opposite sides of said third cross extend in opposite directions arm portions 20, that are equal in lateral extent to that of said arm portions 17 of said second cross. Said arm portions 17 and 20 of said second and third crosses being of the same lateral extent, create an equal distance between said second and third crosses on the one hand and the said first elongated cross upon the other hand, while a relatively narrow and shallower groove, of the same size as the groove 16, forms a continuing zig-zag separation between said third and said first crosses, so that upon assembly as shown in FIGS. 1 and 3 the arrangement of said three crosses creates a completely regular assembly in design of the several parts of the surface configuration upon each side of said separation groove 7.

If this arrangement is followed from one point on the tire tread completely around the tread until the starting point is again reached, it will be found that a complete and continuous sequence of surface irregularities is provided, and as the wheels upon which the tires are mounted are caused to revolve, there is a continuous and unbroken engagement and resulting propulsion of the tires upon the ground of whatever surface it may be composed, and the vehicle will resultingly be caused to move as desired. As the tread surfaces wear down but a relatively short distance, and the embossed surfaces wear away to but a relatively slight degree, the original grooves 16 and become worn away and contact with the surface carrying the vehicle will become a series of continuous rectangular areas surrounded by portions of the crosses 9, 17, 15, 18 and 11, and these separate but fully enclosed rectangular cupped areas will have become in effect suction cups, that will further result in a road-clinging or gripping area.

At the same time those areas partially enclosed by portions 9, 14 and 17 of the crosses become U-shaped enclosures, while in the same way those portions 10, 19 and 20 will have become additional U-shaped enclosures. Thus, the gripping of the tire treads become more and more effective as they wear down, and this may be further effected by increasing the cross sectional values of the cross bases.

Having thus described the invention, what I claim and desire to protect by Letters Patent of the United States is:

A tire tread for mechanically driven vehicles, comprising longitudinally arranged transversely disposed alternately positioned pairs of long crosses and intervening groups of shorter aligned crosses, each of said long crosses being of the same overall length as adjacent pairs of said shorter crosses, the subtantially central portion of said longer cross and the adjacent portions of said shorter crosses, and certain of the arms of said crosses initially encircling depressed areas until said crosses have become relatively slightly worn away through normal use.

References Cited by the Examiner
UNITED STATES PATENTS

D. 57,899  5/21  Graham _____ D90—20
D. 73,004  7/27  Mann _____ D90—20

ARTHUR L. LA POINT, *Primary Examiner.*

PHILIP ARNOLD, *Examiner.*